(12) United States Patent
Aguirre-Esponda et al.

(10) Patent No.: US 6,375,150 B1
(45) Date of Patent: Apr. 23, 2002

(54) KNOB FOR GAS APPARATUS WITH SAFETY BUTTON

(75) Inventors: Guillermo-Jose Aguirre-Esponda, San Luis Postosi; Jose-Angel Avalos-Barcenas, San Luis Potosi, both of (MX)

(73) Assignee: Comercial Acros Whirlpool, S.A. de C.V., Nuevo Leon (MX)

( * ) Notice: Subject to any disclaimer, the term of this patent is extended or adjusted under 35 U.S.C. 154(b) by 0 days.

(21) Appl. No.: 09/595,492

(22) Filed: Jun. 16, 2000

(30) Foreign Application Priority Data

Jun. 18, 1999 (MX) ................................................ 995700

(51) Int. Cl.[7] .............................. F16K 35/00; F24C 3/12
(52) U.S. Cl. ........................................... 251/96; 126/42
(58) Field of Search ............................... 251/96; 126/42

(56) References Cited

U.S. PATENT DOCUMENTS

| | | | | |
|---|---|---|---|---|
| 3,693,874 A | * | 9/1972 | Fox ............................. | 236/15 |
| 4,300,525 A | * | 11/1981 | Delgado et al. .............. | 126/42 |
| 4,527,540 A | | 7/1985 | Ryan et al. ................... | 126/42 |
| 4,691,895 A | * | 9/1987 | Garff ........................... | 251/292 |
| 5,363,720 A | * | 11/1994 | Sanchez ....................... | 74/553 |
| 5,623,854 A | * | 4/1997 | Snider .......................... | 74/553 |
| 5,771,878 A | * | 6/1998 | Lewis et al. .................. | 126/14 |

* cited by examiner

*Primary Examiner*—Philippe Deraksham
*Assistant Examiner*—David A Bonderer
(74) *Attorney, Agent, or Firm*—Abelman, Frayne & Schwab

(57) ABSTRACT

The invention provides a knob with safety button for a domestic gas that includes a gas valve. A stem is integrated with the gas valve, which is pressed by the knob to press and to simultaneously rotate the stem of the gas valve for opening and regulating the flow of gas through of the valve. The improvements comprising a safety button coupled with the knob, the button being connected by one end with the stem of the valve, for avoiding that the valve be operated in a turn condition when the knob is only pressed, or for facilitating the turn of the knob when the safety button is pressed.

6 Claims, 3 Drawing Sheets

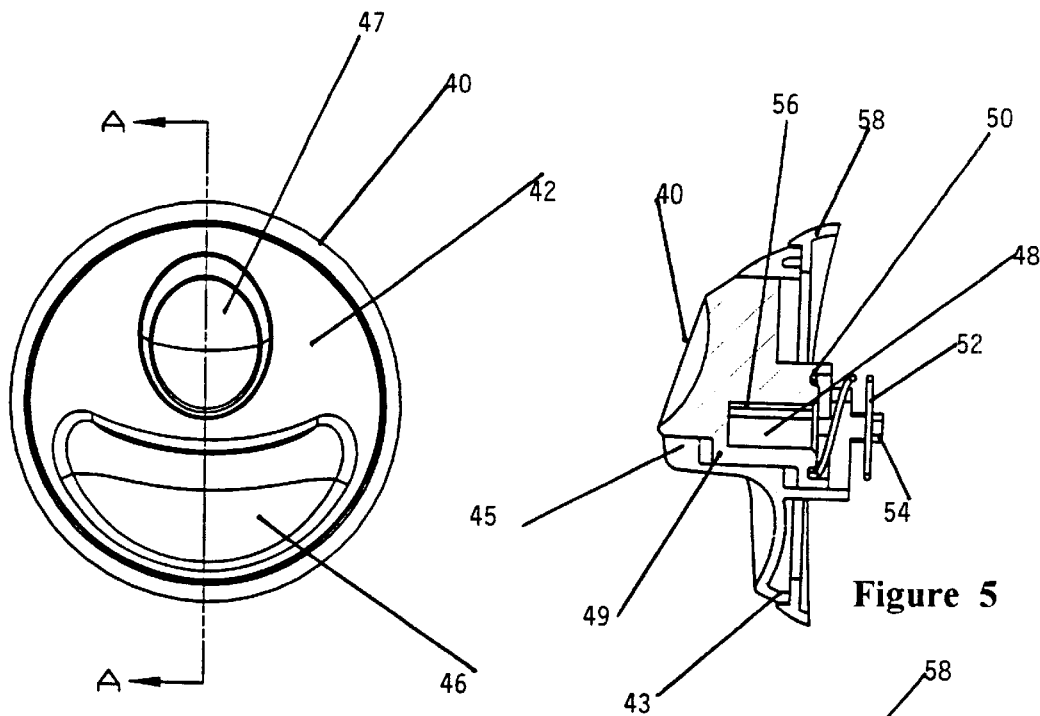
Figure 4
Figure 5
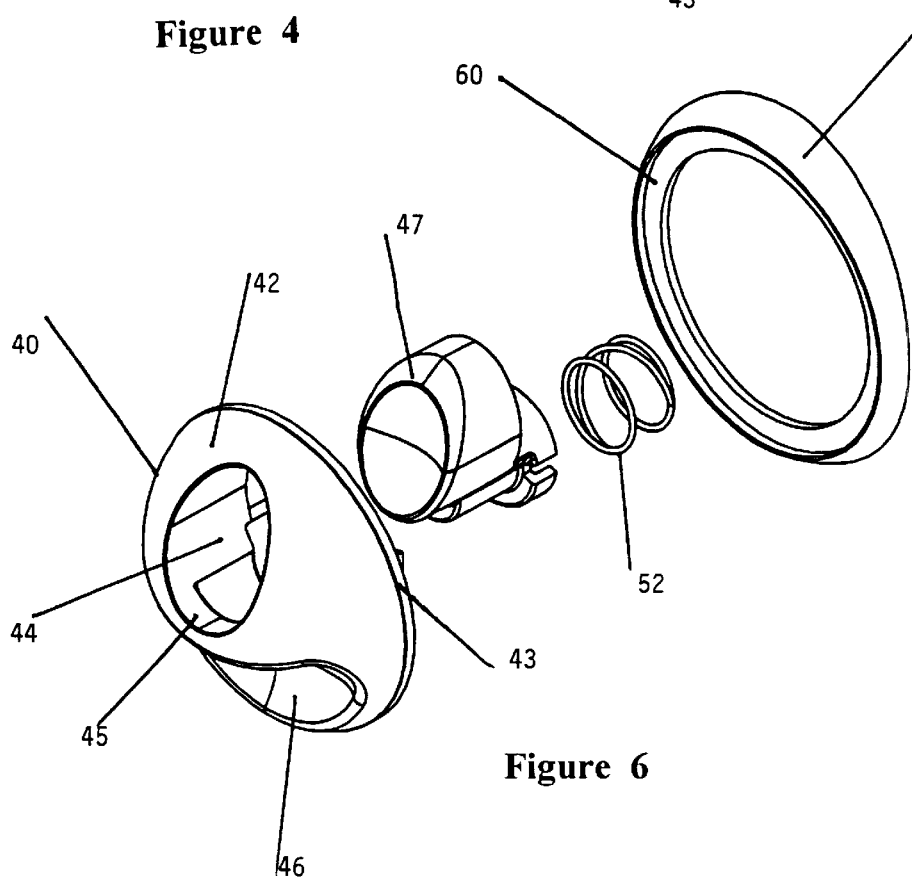
Figure 6

KNOB FOR GAS APPARATUS WITH SAFETY BUTTON

FIELD OF THE INVENTION

The present invention refers to knobs for gas valves, and more particularly, to a knob with safety button for a gas range, which prevents the user from inadvertently opening the gas tap and prevents that it be operated by children.

BACKGROUND OF THE INVENTION

There are already available in the market domestic gas valves, which have a coupling-uncoupling mechanism between a stem of the valve and a closing element, this latter having the shape of a cone, a cylinder or a disc. In order to be able to operate the gas valve, it is necessary that the user push a knob to couple the stem for opening and closing the elements of the valve. During this operation, the force of pushing on the knob must be sustained, and the knob simultaneously turned (normally towards the left) so that the valve will open, thus permitting the regular flow of gas towards the burner.

However, one of the problems of the assembly of the knobbed-gas valves is that they accidentally sometimes are operated by the user or mainly by children, thus causing the gas to escape through the burners and putting the home or building safety of the user where the apparatus is installed at risk.

There are already some safety devices available in the market for blocking children's access to range knobs, for example, the U.S. Pat. No. 4,300,525 issued to Jesús Delgado and George Spector describes a safe knob assembly for a kitchen gas stove burner, comprising in combination, a knob integral with shank having a square central opening slidably fitted on a square end of a stem of a gas valve along a gas line of a stove, a cam-faced spur on a side of said shank, and a stationary stop mounted separately adjacent said spur in combination with means for axially moving said shank in response to rotation in one direction of said shank and wherein rotation in opposite direction is restricted by engagement of said spur and stop. However, the operation of the knob can be operated by children.

Another form of protecting gas range knobs from children is illustrated in the U.S. Pat. No. 4, 527,540 issued to Kathryn A. Ryan, which describes a safety shield for isolating a heated appliance, such as a stove or an oven, from the reach of children includes a flexible sheet of material having securing portions along opposite vertical edges for securing the sheet adjacent the sides of the front face of the appliance and an arched shielding portion extending horizontally between the securing portions and spanning the front face of the appliance, the arched shielding portion being bowed outwardly away from the front face of the appliance to shield the appliance from the reach of children. However, the safety shield needs to be removed by the user in order to gain access to the gas knobs.

There are other designs such as guards that only cover the knobs, which are manufactured out of transparent, temperature resistant material.

In accordance with the above, the present invention refers to a safety knob for domestic gas apparatuses, which prevents or deters children from operating the valve.

OBJECTIVES OF THE INVENTION

It is therefore a first objective of the present invention to provide a knob for a valve of a gas range, with an integral safety button, which is difficult for children to operate.

It is another objective of the present invention to provide a knob for a valve of a gas range, with an integral safety button, which does not need additional elements to cover the knobs that can alter their appearance or functionality of the ranges.

An additional objective of the present invention is to provide a knob for a valve of a gas range, with an integral safety button, which can be used with any type of conventional safety valves.

These and other objectives and advantages of the present invention will be evident to the experts in the field from the following detailed description of the invention, which is illustrated in the attached drawings.

BRIEF DESCRIPTION OF THE DRAWINGS

FIG. 4 shows a front view of a second embodiment of the knob for a valve of a gas range, with an integral safety button, in accordance with the present invention;

FIG. 5 shows a laterally cut view, taken of FIG. 4, of the knob of the present invention; and, FIG. 6 shows an exploded view of an assembly of the knob, with an integral safety button, in accordance with second embodiment of the present invention.

DETAILED DESCRIPTION OF THE INVENTION

Figure 1:
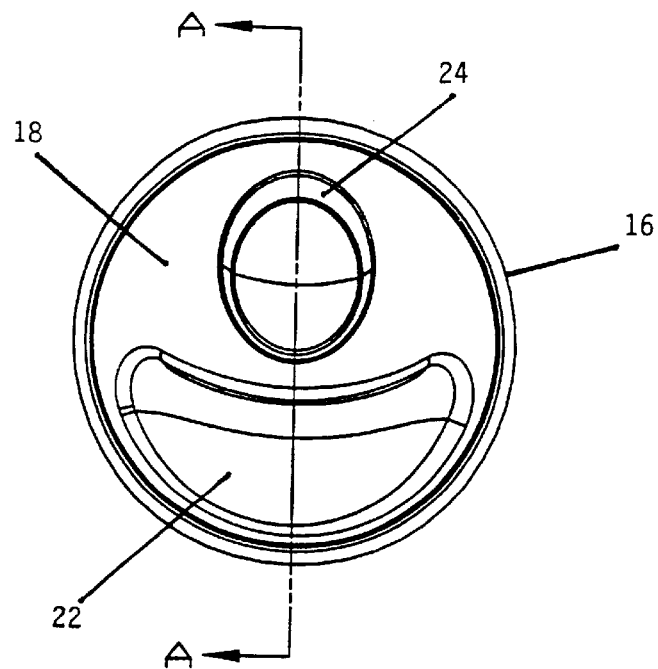
FIG. 1 shows a front view of a first embodiment of the knob for a valve of a gas range, with an integral safety button, in accordance with the present invention.
Figure 3:
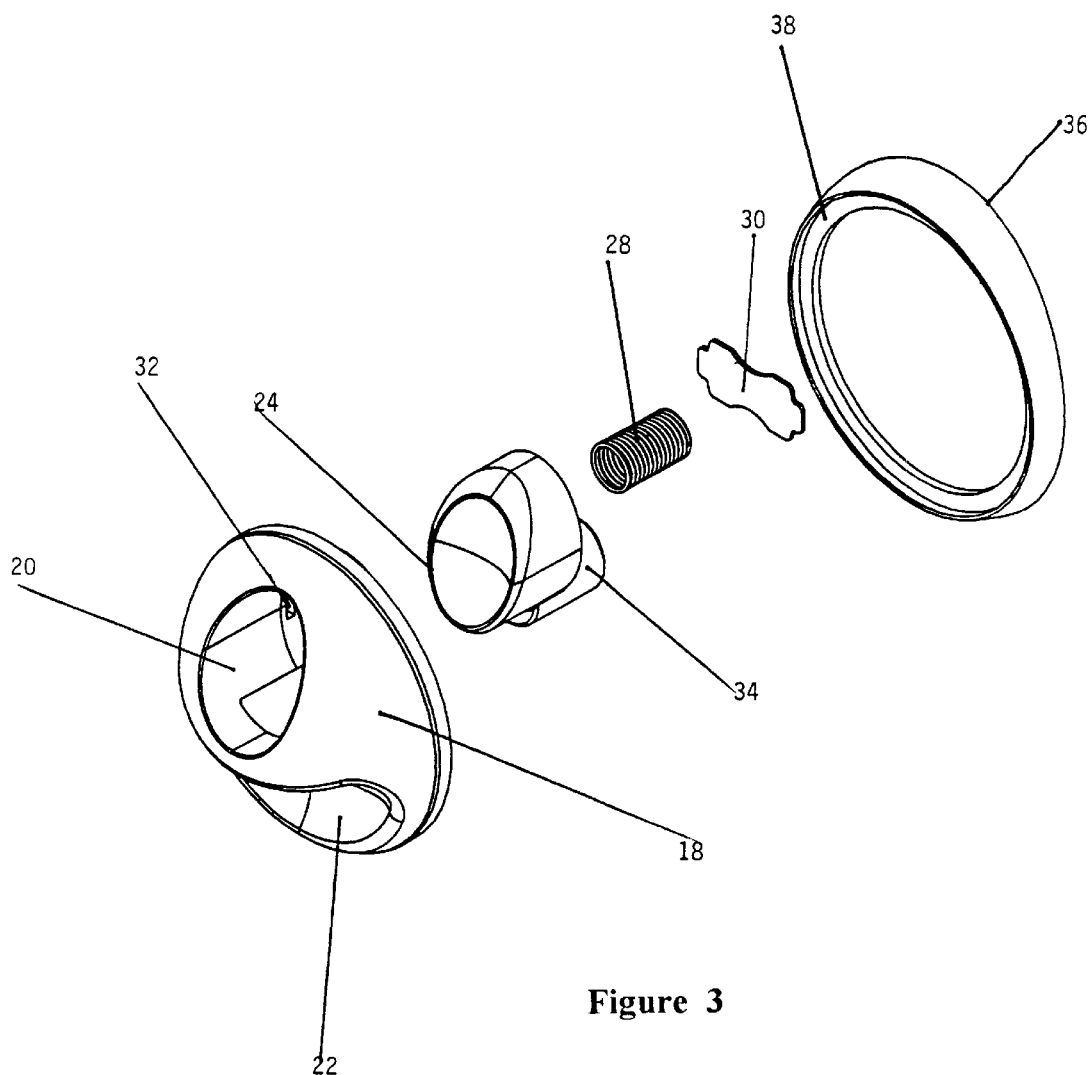
FIG. 3 shows an exploded view of an assembly of the knob, with an integral safety button, in accordance with the present invention.

Now, making particular reference to FIGS. 1 and 3, a first embodiment of the present invention is shown, wherein is illustrated in a schematic form the body of a gas valve 10, which has a stem 12, which is pushed against the body of said valve 10, and simultaneously it is made to rotate the valve 10.

Figure 2:
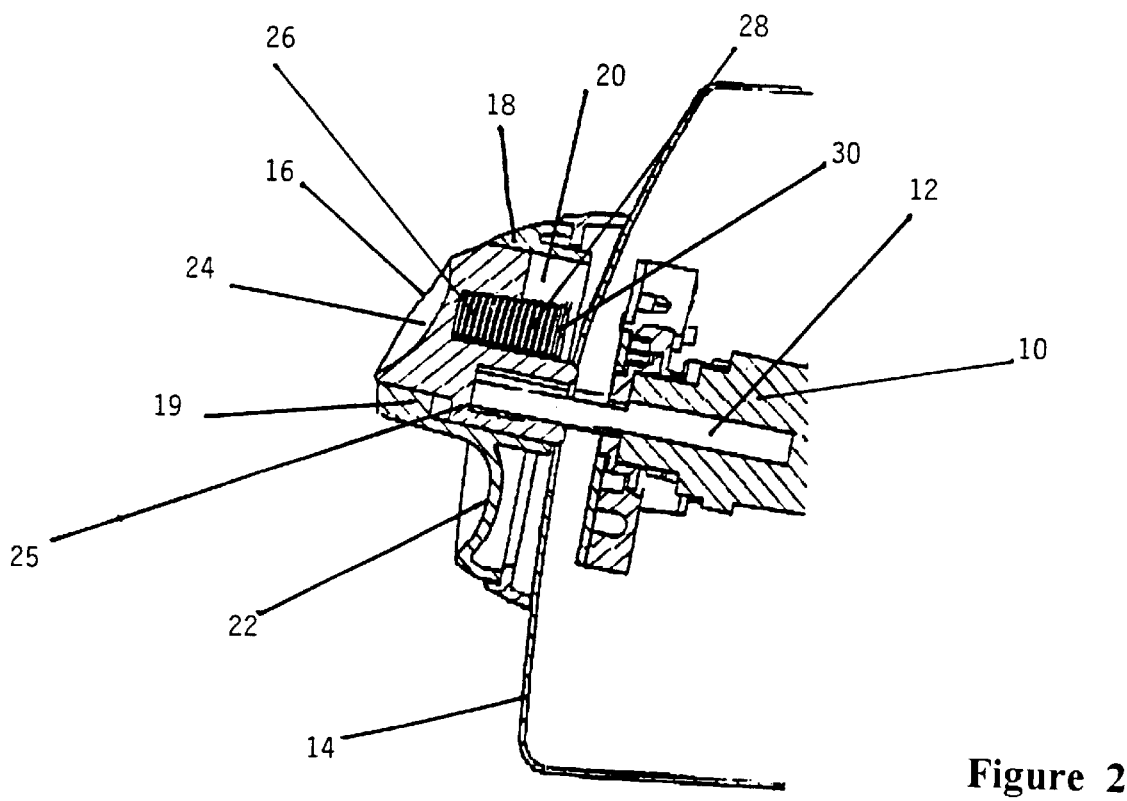
FIG. 2 shows a laterally cut view, taken of FIG. 1, of the knob of the present invention.

In the FIG. 2 is showed the assembly of the valve 10 and the stem 12, located at the front of a board 14 or in front of knobs of a range (not shown).

A knob 16 comprising a first body 18, which has a longitudinal passageway or eccentric orifice 20 and a front recess 22 for user's fingers. The body of the knob 18 further includes a stop element 19, for limiting the outward axial movement of a retractable push button or pusher bar 24, as will be described hereafter.

The retractable push button or pusher bar 24 is housed in the eccentric orifice 20 in the body of the knob 18, for applying a pushing movement to the stem 12 of the valve 10. Said pusher bar 24 having a cylindrical projection 25, at the frontal part, which is placed in a direct relation to the stop element 19, for limiting the outward axial movement of the pusher bar 24. A first cylindrical recess 26 is provided for housing a spring 28, in order to relocate the pusher bar 24, toward its original position, once the pusher bar or button 24 is not pressed by the user. A girder element 30 is housed between two radial recesses 32, said girder element 30 are located in the back end of the eccentric orifice 20 of the body of the knob 18. The spring 28 is housed in said first cylindrical recess 26, in order to return the pusher bar 24, to an original position in the eccentric orifice 20. A second recess 34 in the form of a half-cane, is also located in eccentric form with respect to the shaft of the pusher bar 24, to permit the introduction of the stem 12.

And a ring 36, which comprises a circumferential flat surface 38, where the body of the knob 18 is positioned in order to facilitate the rotation of said knob 16 and for limiting the pushing movement of the body of the knob 18.

Making now particular reference to the FIGS. 4 through 6, a second embodiment is shown. A knob 40 comprising a body 42, which has an eccentric orifice 44 and a recess 46 to be gripped by the user. The body of the knob 42 furthermore includes a stop element 45, for limiting the outward axial movement of the pusher bar or button 47, as will be described as follows.

The pusher bar or button 47 is housed in the eccentric orifice 44 of the body of the knob 42, for transmitting the force toward the stem 48 of a valve (not shown). Said pusher bar or button 47 having a cylindrical projection 49, near of its frontal section, which is placed in a direct relation with the stop element 45 of the body of the knob 42, for limiting the outward axial movement of the pusher bar or button 47. A cylindrical recess 50 for the housing of a spring 52 in order to maintain the assembling of the pusher bar or button 47 and the body of the knob 42. The spring 52 is housed in said cylindrical cavity 50. One end is located in said cavity 50 and in the other end is located between two hooks 54, which forms part of the body of the knob 42, for returning the pusher bar or button 47, to the original position in the eccentric orifice 44. A cavity 56, generally in a form of half-cane, which located in concentric way with respect to the cylindrical cavity 50, for permitting the introduction of the stem 48.

And a ring 58, which comprises a circumferential flat surface 60, where the body of the knob 42 is positioned in order to facilitate the rotation of said knob 40 and, for limiting the pushing movement of the body of the knob 42.

In accordance with the embodiment illustrated in the FIGS. 4 through 6, the function of the spring 52 is to maintain the contact of a flat surface 43 of the body of the knob 42 together with the circumferential flat surface 60 of the ring 58.

Even when two embodiments of the present invention have been described, it must be finally understood that the knob of the present invention, which has been described above, are only embodiments of the same and that the experts in the field will be able, through the teaching of the present invention, to make changes in its design and distribution. However, they will be included in the true spirit and scope of the invention that is claimed in the following claims.

We claim:

1. A knob with a safety button for a domestic gas range, which comprises: a body of a gas valve; a stem integral with said gas valve, said stem being pressed against the body of said gas valve for pressing and simultaneously rotating the stem in the body of said gas valve to open and regulate the flow of gas through said valve;

said knob having a longitudinal passageway therethrough; and, pushing means housed within the longitudinal passageway of said knob, said pushing means including a first orifice formed in a rear section of said pushing means; a resilient element housed in said first orifice for returning the pushing means to an original pushing position, said resilient element being coupled between said first orifice of the pushing means and said knob; and a second orifice in the rear section of said pushing means, said second orifice being connected with the stem of the valve, whereby the pushing means are used to either prevent the knob from being turned on in an operating condition or to facilitate the turning of the knob when the pushing means are pressed.

2. The knob with safety button for a domestic gas range as claimed in claim 1, wherein the pushing means includes a stop projection (25) located in a front section of said pushing means (24); and, the knob (16) includes a stop element (19) for limiting outward axial movement of the pushing means, said stop projection (25) and said stop element (19) being operatively connected for limiting outward axial movement of the pushing means (24) in the knob.

3. The knob with safety button for a domestic gas range as claimed in claim 1, wherein the resilient element is a spring.

4. The knob with safety button for a domestic gas range as claimed in claim 1, wherein the first orifice and the second orifice of the pushing means are concentric with respect to one another.

5. The knob with safety button for a domestic gas range as claimed in claim 1, wherein the pushing means is a retractable push button.

6. The knob with safety button for a domestic gas range as claimed in claim 1, wherein the knob further comprises a ring, the ring comprising a circumferential flat surface to facilitate the rotation of said knob and for limiting the axial pushing movement of the knob toward a panel section in front of the gas range.

* * * * *